United States Patent
Lolli

(10) Patent No.: US 8,528,448 B2
(45) Date of Patent: Sep. 10, 2013

(54) KIT, WITH A SELECTION VALVE, FOR REPAIRING AND INFLATING INFLATABLE ARTICLES

(75) Inventor: Sergio Lolli, Pesaro (IT)

(73) Assignee: TEK Global S.R.L., Pesaro (IT)

( * ) Notice: Subject to any disclaimer, the term of this patent is extended or adjusted under 35 U.S.C. 154(b) by 188 days.

(21) Appl. No.: 13/128,665

(22) PCT Filed: Nov. 13, 2009

(86) PCT No.: PCT/IB2009/007439
§ 371 (c)(1),
(2), (4) Date: Aug. 10, 2011

(87) PCT Pub. No.: WO2010/055401
PCT Pub. Date: May 20, 2010

(65) Prior Publication Data
US 2012/0017727 A1 Jan. 26, 2012

(30) Foreign Application Priority Data
Nov. 13, 2008 (IT) .............................. TO2008A0838

(51) Int. Cl.
*B29C 73/16* (2006.01)
(52) U.S. Cl.
USPC .............................................. 81/15.6; 141/38
(58) Field of Classification Search
USPC ................ 81/15.6; 141/38, 114, 311 R, 313; 137/223, 224
See application file for complete search history.

(56) References Cited

U.S. PATENT DOCUMENTS
2,434,991 A * 1/1948 Crowley .......................... 141/38

FOREIGN PATENT DOCUMENTS
| CN | 1604840 A | 4/2005 |
| CN | 2806818 Y | 8/2006 |
| CN | 1925978 A | 3/2007 |
| EP | 2 058 112 A | 5/2009 |
| IT | T020 070 776 A1 | 1/2008 |
| WO | 2005/085028 A | 9/2005 |
| WO | 2005/115730 A1 | 12/2005 |

OTHER PUBLICATIONS

Non-English Action dated May 27, 2013 for Application No. CN 200980145497.3 and English translation.

* cited by examiner

*Primary Examiner* — David B Thomas
(74) *Attorney, Agent, or Firm* — Ladas & Parry LLP

(57) ABSTRACT

A kit for repairing and inflating inflatable articles, and having a compressor assembly for generating compressed air; releasable connecting means fixed with respect to the compressor assembly and for connecting the compressor assembly mechanically and fluidically to a sealing liquid container assembly; a first pipe connecting the compressor assembly to the container assembly; a second pipe parallel to the first pipe with respect to the compressor assembly; and a valve interposed between the compressor assembly and the first and second pipe. The valve defines a cavity bounded by a conical surface; a rotary distribution member cooperating in fluidtight manner with the conical surface; an inlet connected to the compressor assembly; a first outlet connected to the first pipe; and a second outlet connected to the second pipe.

8 Claims, 4 Drawing Sheets

# KIT, WITH A SELECTION VALVE, FOR REPAIRING AND INFLATING INFLATABLE ARTICLES

TECHNICAL FIELD

The present invention relates to a kit, with a selection valve, for repairing and inflating inflatable articles, in particular tyres.

BACKGROUND ART

Kits are known comprising a compressor; a container of sealing liquid, connected to the compressor; a hose connecting the container assembly to a tyre; and a second hose connecting the compressor directly to the tyre without injecting the sealing liquid.

Known kits comprise a control valve for setting the kit to repair mode and inflation-only mode. The valve comprises an inlet connected fluidically to the compressor; a first outlet connected to the container of sealing liquid; and a second outlet connected to the second hose.

Currently used valves do not guarantee effective airtightness, thus impairing performance of the kit: relatively long inflation time, and relatively poor, or at least improvable, compressor efficiency.

DISCLOSURE OF INVENTION

It is an object of the present invention to provide a kit for repairing and inflating inflatable articles, designed to eliminate the above drawback.

According to the present invention, there is provided a kit for repairing and inflating inflatable articles, as claimed in claim 1.

BRIEF DESCRIPTION OF THE DRAWINGS

A preferred embodiment of the present invention will be described by way of example with reference to the accompanying drawings, in which.

BEST MODE FOR CARRYING OUT THE INVENTION

Figure 1:
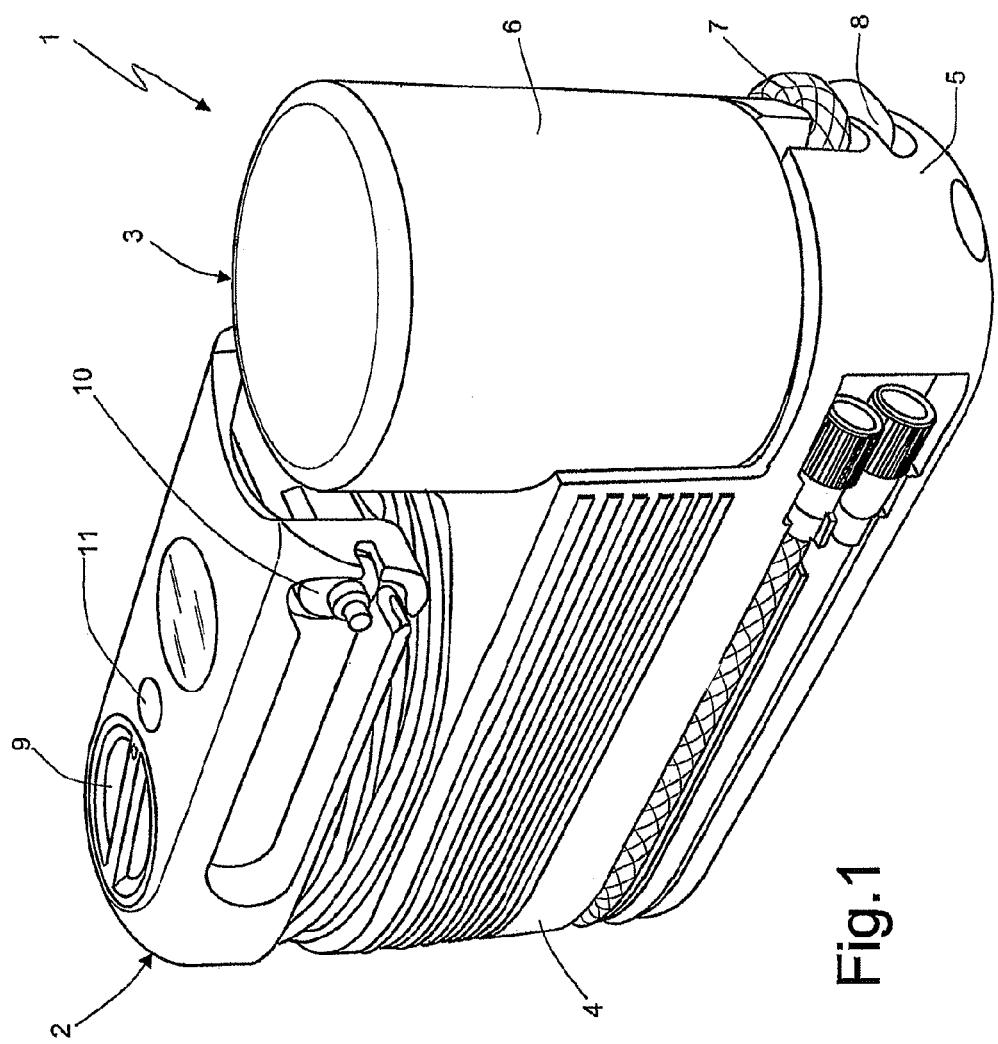
FIG. 1 shows a view in perspective of a kit in accordance with the present invention.

Number 1 in FIG. 1 indicates as a whole a kit for repairing and inflating inflatable articles, and comprising a casing 2; a compressor assembly C (shown schematically in FIG. 2) housed in casing 2; and a container assembly 3 connected releasably to compressor assembly C, e.g. as described and illustrated in International Patent Application WO-A1-2008001179 filed by the present Applicant.

More specifically, casing 2 comprises a substantially parallelepiped-shaped portion 4 housing compressor assembly C; and a projecting portion 5 projecting frontwards from portion 4 to define a seat at least partly housing container assembly 3.

Container assembly 3 contains a sealing liquid for repairing a punctured tyre, and comprises a bottle 6 turned upside down in use; and a hose 7 connected to bottle 6 to feed the sealing liquid into the tyre.

Kit 1 also comprises a second hose 8 connected directly to compressor assembly C to inflate the tyre without injecting sealing liquid; and control means for selecting a repair mode, in which hose 7 and bottle 6 are connected to compressor assembly C, and an inflation mode, in which hose 8 is connected to compressor assembly C. The control means comprise, for example, a valve 12 switchable by a knob 9 on casing 9, and having two outlets connected to container assembly 3 and hose 8 respectively.

Kit 1 also comprises a power plug 10 for powering compressor assembly C from a vehicle electric system; and a switch 11 for turning compressor assembly C on.

Figure 2:
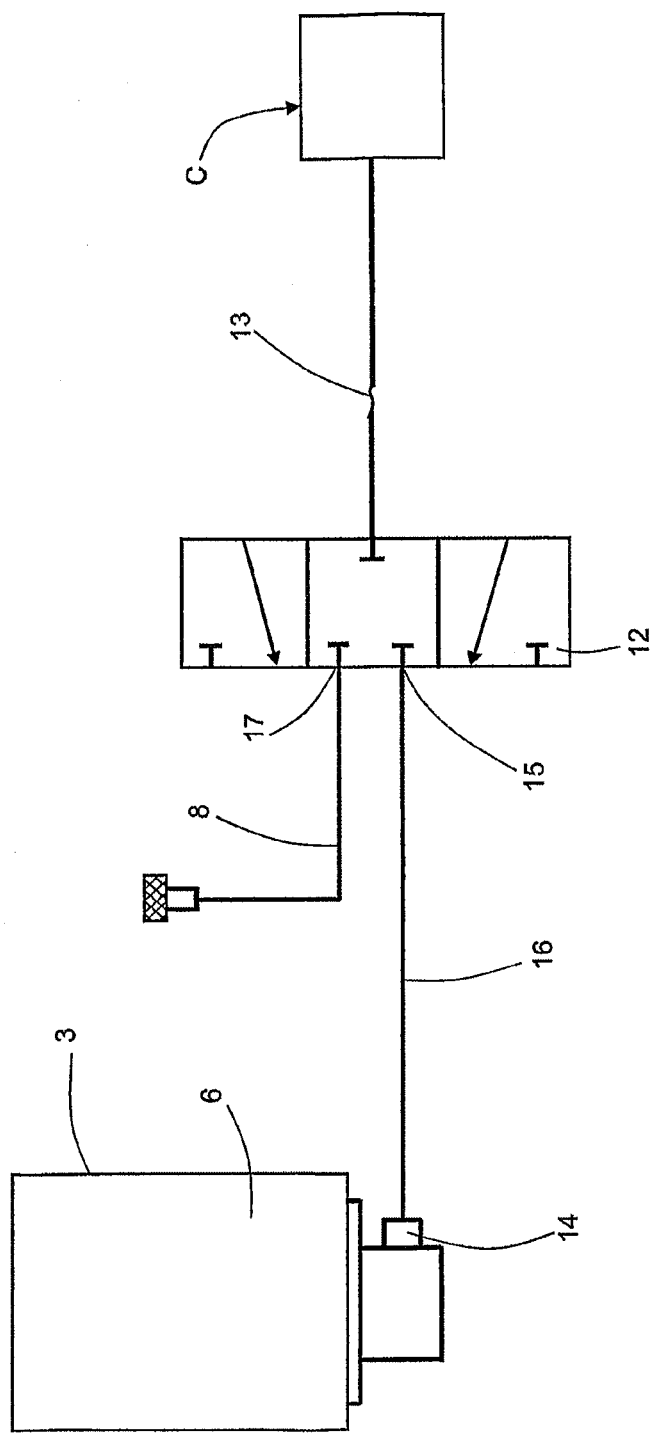
FIG. 2 shows a diagram of a fluidic system of the FIG. 1 kit.

FIG. 2 shows an internal fluidic circuit of kit 1, which comprises compressor assembly C; valve 12 connected to compressor assembly C by an internal pipe 13; container assembly 3 having an inlet 14 connected to an outlet 15 of valve 12 by a pipe 16, and an outlet connected to hose 7; and hose 8 connected to an outlet 17 of valve 12.

Figure 3:
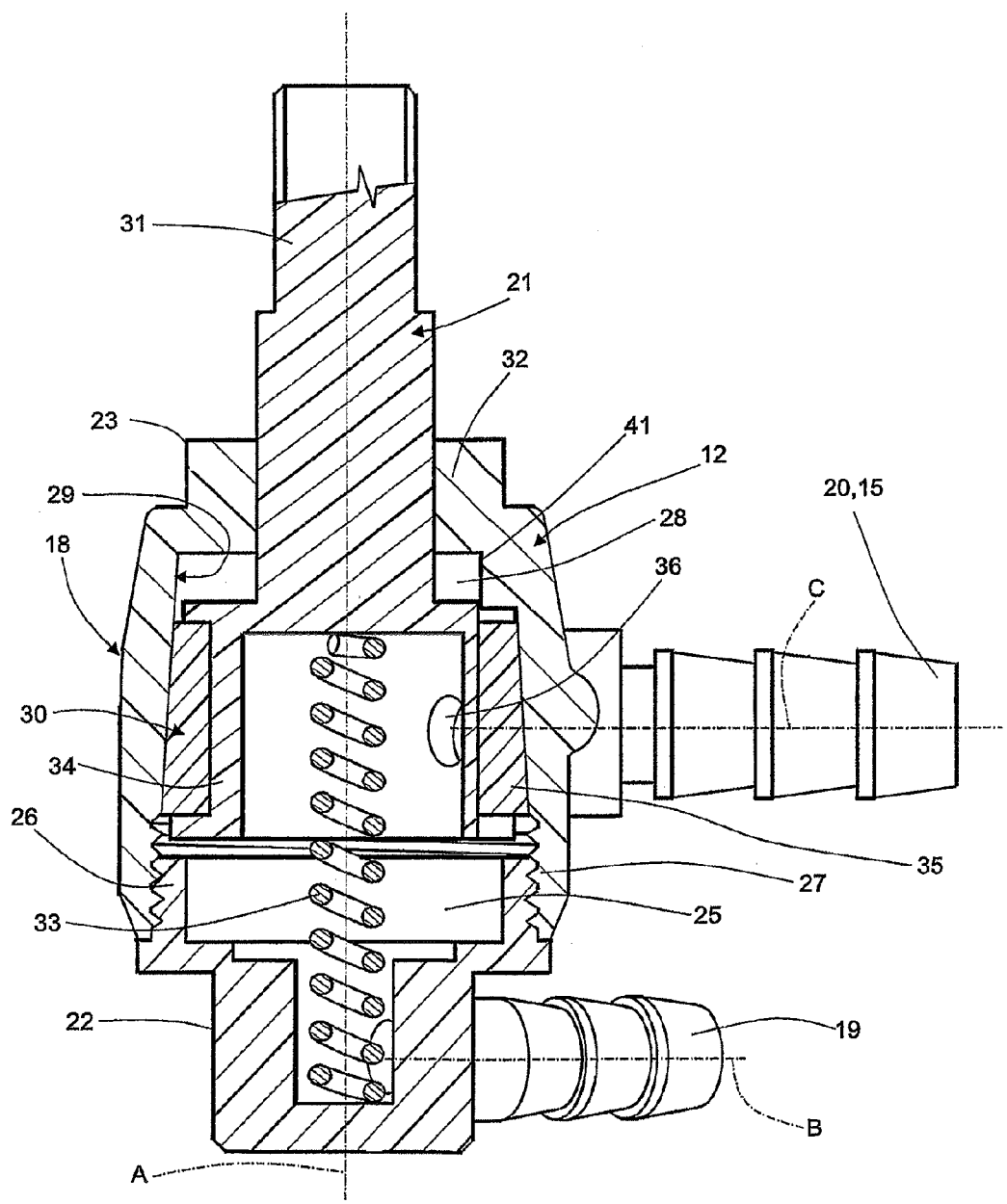
FIG. 3 shows a longitudinal section of a component part of the FIG. 1 kit.

More specifically (FIG. 3), valve 12 comprises a hollow body 18 having an inlet 19, a tubular portion 20 defining outlet 15, a tubular portion (not shown) defining outlet 17; and a rotary distribution member 21 connected to knob 9.

Hollow body 18 is preferably defined by a base 22 supporting inlet 19, and by a top end member 23 connected releasably, e.g. by a threaded connection, to base 22.

Base 22 comprises a central portion 24 defining a cylindrical cavity 25 of axis A; and tubular portion 19 having an axis B perpendicular to axis A and connected fluidically to cylindrical cavity 25. More specifically, cavity 25 has a top portion bounded axially by an externally threaded portion 26 of base 22; and a bottom portion smaller in diameter than the top portion and in which terminates the conduit defined by tubular portion 19.

Top end member 23 has an internally threaded portion 27, which engages externally threaded portion 26, and defines outlets 15 and 17 bounded by the respective tubular portions, each of which has an axis C (only one shown). Axes C preferably lie in the same plane perpendicular to axis A.

Top end member 23 also defines a cavity 28, in which the conduits to outlets 15 and 17 terminate, and which is bounded circumferentially by a conical surface 29 converging on the opposite side of threaded portion 26 to tubular portion 19.

Rotary distribution member 21 comprises a hollow body 30 housed in cavity 28; and a rod 31 having a first end portion connected rigidly to hollow body 30, and a second end portion opposite the first end portion and connected rigidly to knob 9.

Rod 31 is supported radially in a through hole defined by a top wall 32 of top end member 23, and is loaded by a spring 33 which exerts axial force directed to close the clearance between rotary distribution member 21 and conical surface 29.

When hollow body 18 is assembled and spring 33 exerts force on rotary distribution member 21, the axial dimension of rotary distribution member 21 is such as to leave an axial clearance between threaded portion 26 and the distribution member when knob 9 is not operated by the user.

More specifically, hollow body 30 comprises a drum 34 fixed with respect to rod 31 and defining a cavity housing an end portion of spring 33; and a conical bush 35 made of sealing polymer material, such as polytetrafluoroethylene, and contacting conical surface 29. Conical bush 35 is housed in a seat defined by drum 34, and hollow body 30 also defines a radial through hole 36 for selectively connecting outlets 15, 17 fluidically to inlet 19.

Figure 4:
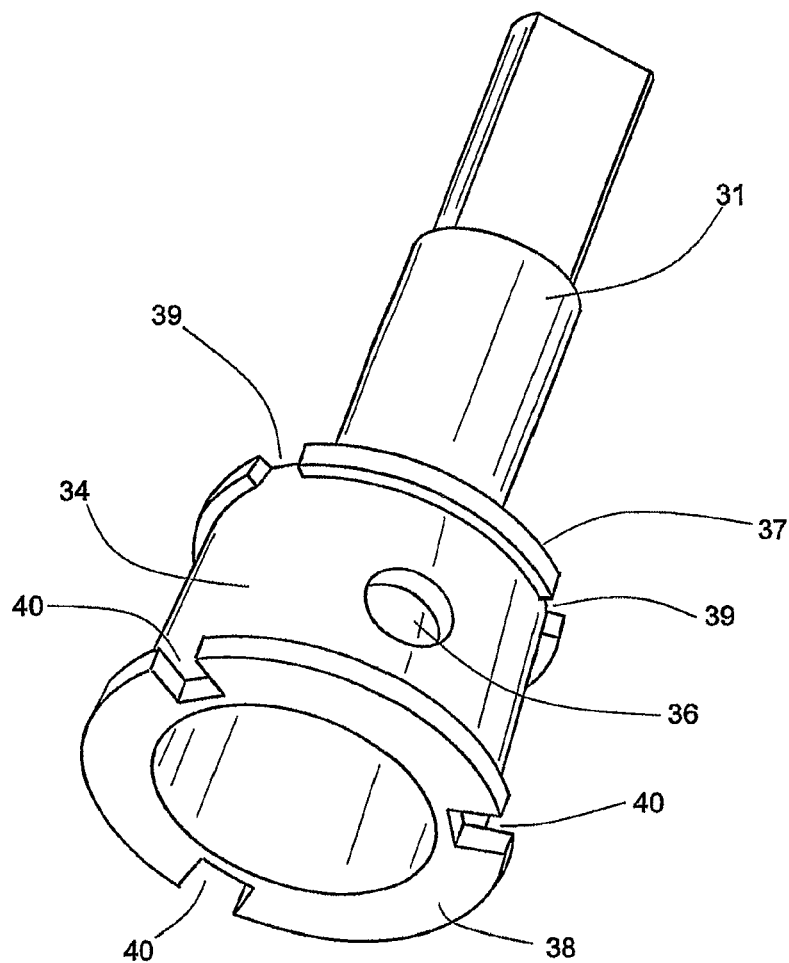
FIG. 4 shows a view in perspective of a detail in FIG. 3.

As shown in FIG. 4, drum 34 defines a top shoulder 37 facing top wall 32; and a bottom shoulder 38 facing base 22.

Shoulders 37, 38 define the size of the seat of conical bush 35 along axis A, and have respective numbers of slots 39, 40, e.g. equally spaced 120° apart.

Inside cavity 28, conical surface 29 defines a tooth 41, which engages one of slots 39 to angularly lock rod 31.

In actual use, spring 33 holds bush 35 in contact with conical surface 29, and tooth 41 engages a slot 39. Slots 39 and tooth 41 are positioned angularly with respect to one another, so that radial through hole 36 is aligned with outlet 15 or outlet 17.

To change operating mode, the user presses knob 9, so bottom shoulder 38 rests on externally threaded portion 26, which thus defines an axial stop. The location of the stop is such that tooth 41 disengages slot 39, so hollow body 30 can be rotated by the user by means of knob 9, and rotary distribution member 21 is therefore rotated when bush 35 is detached from conical surface 29.

Once the required mode is set, the precise angular position is established by tooth 41 engaging the relative slot 39 when the user releases pressure on the knob.

The elastomeric material of conical bush 35 defines a seal to prevent air leakage. Sealing is achieved by the action of spring 33, by the slope of conical surface 29, and by the pressure of the airflow, which acts both dynamically and hydrostatically on rotary distribution member 21 to produce a thrust component in the same direction as the action of spring 33 when compressor assembly C is activated.

The kit according to the present invention has the following advantages.

Air leakage is reduced by a seal whose effectiveness increases with airflow pressure, thus improving the efficiency of the kit and enabling faster repair and inflation.

The selection valve operating modes are easy to set by means of the click-in mechanism defined by slots 39, tooth 41, and spring 33; and the angular positions of hollow body 30 are such as to minimize load losses by aligning the conduits.

The axial movement of rotary distribution member 21 prevents it from adhering to conical surface 29, and rotation of the distribution member when it is detached from conical surface 29 prevents wear of bush 35.

Clearly, changes may be made to the kit as described and illustrated herein, without, however, departing from the protective scope defined in the accompanying Claims.

For example, hollow body 18 may be made of metal or molded from polymer material.

The invention claimed is:

1. A kit for inflating and repairing inflatable articles comprising a compressor assembly (C) for generating a compressed air flow, releasable connecting means fixed with respect to said compressor assembly (C) adapted to mechanically and fluidically connect said compressor assembly (C) to a container assembly (3) for a sealing liquid, a first pipe (16) adapted to connect said compressor assembly (C) to said container assembly (3) and a second pipe (8) arranged in parallel to said first pipe (16) with respect to said compressor assembly (C) and a valve (12) interposed between said compressor assembly (C) and said first and second pipes (16, 8), characterized in that said valve (12) defines a cavity (28) delimited by a conical surface (29), a rotating distribution element (21) fluid-tightly cooperating with said conical surface (29), an inlet (19) connected to said compressor assembly (C), a first outlet (15) connected to said first pipe (15) and a second outlet (17) connected to said second pipe (8), wherein said inlet (19), said first and second outlets (15, 17) and said rotating distribution element (21) are arranged in relation to said cavity (28) so that, when said compressor assembly (C) is on, the pressure generated by the compressed air flow presses said rotating distribution element (21) against said conical surface (29).

2. A kit according to claim 1, characterized in that said rotating distribution element (21) is movable in a parallel direction with respect to the rotation axis thereof.

3. A kit according to claim 2, characterized in that said cavity (28) is defined by a casing (18) comprising a first and a second element, and in that one of said first and second elements (22, 23) defines an end-of-travel for said rotating distribution element (21).

4. A kit according to claim 2, characterized in that said rotating distribution element (21) is connected to a knob (9) operable by a user.

5. A kit according to claim 1, characterized in that it comprises elastic means (33) configured to keep said rotating distribution element (21) against said conical surface (29).

6. A kit according to claim 1, characterized in that one of said conical surface and said rotating distribution element (29, 21) defines at least two slots (39) and the other defines a tooth (41) selectively engageable in said slots (39) to define a first and a second angular position, in which said compressor assembly (C) is connected to said first pipe (15) and to said second pipe (17), respectively.

7. A kit according to claim 1, characterized in that said rotating distribution element (21) comprises a separate sleeve (25).

8. A kit according to claim 1, characterized in that it comprises said container (3) for the sealing liquid connected to said compressor assembly (C) in a releasable manner.

* * * * *